(12) United States Patent
Gando et al.

(10) Patent No.: US 11,193,769 B2
(45) Date of Patent: Dec. 7, 2021

(54) SENSOR

(71) Applicant: KABUSHIKI KAISHA TOSHIBA, Tokyo (JP)

(72) Inventors: Ryunosuke Gando, Yokohama Kanagawa (JP); Tamio Ikehashi, Yokohama Kanagawa (JP); Yasushi Tomizawa, Tokyo (JP); Shiori Kaji, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 16/815,189

(22) Filed: Mar. 11, 2020

(65) Prior Publication Data

US 2020/0363205 A1    Nov. 19, 2020

(30) Foreign Application Priority Data

May 15, 2019   (JP) .............................. JP2019-092045

(51) Int. Cl.
*G01C 19/5776*    (2012.01)
*G01C 19/5712*    (2012.01)
*G01K 13/00*    (2021.01)

(52) U.S. Cl.
CPC ..... *G01C 19/5712* (2013.01); *G01C 19/5776* (2013.01); *G01K 13/00* (2013.01)

(58) Field of Classification Search
CPC . G01C 19/5712; G01C 19/5776; G01K 13/00
See application file for complete search history.

(56) References Cited

U.S. PATENT DOCUMENTS 6,481,285 B1   11/2002   Shkel et al.
6,675,630 B2   1/2004   Challoner et al.
(Continued)

FOREIGN PATENT DOCUMENTS

JP   2016-200512 A   12/2016
JP   2018-163141 A   10/2018

OTHER PUBLICATIONS

Lynch, "Vibratory Gyro Analysis by the Method of Averaging," Proc. $2^{nd}$ St. Petersburg Conf. on Gyroscopic Tech. and Navigation, pp. 18-26 (1995).

(Continued)

*Primary Examiner* — David J Bolduc
(74) *Attorney, Agent, or Firm* — Finnegan, Henderson, Farabow, Garrett & Dunner, L.L.P.

(57) ABSTRACT

According to one embodiment, a sensor includes a movable member, first, and second counter electrodes, first, and second resistances, and a control device. The movable member includes first and second electrodes and is capable of vibrating. The vibration of the movable member includes first and second components. The first component is along a first direction. The second component is along a second direction crossing the first direction. The first counter electrode opposes the first electrode. The second counter electrode opposes the second electrode. The first resistance includes first and first other end portions. The second resistance includes a second end portion and a second other end portion. The first other end portion is electrically connected to the first counter electrode. The second other end portion is electrically connected to the second counter electrode. The control device includes a controller configured to perform at least a first operation.

17 Claims, 12 Drawing Sheets

(56) References Cited

U.S. PATENT DOCUMENTS

| | | | | |
|---|---|---|---|---|
| 6,761,068 B1* | 7/2004 | Schmid | ............ | G01C 19/5712 |
| | | | | 73/504.02 |
| 2007/0227247 A1* | 10/2007 | Weber | ................ | G01C 19/5776 |
| | | | | 73/496 |
| 2012/0096942 A1* | 4/2012 | Hayashi | ............ | G01C 19/5776 |
| | | | | 73/504.12 |
| 2012/0217171 A1* | 8/2012 | Wurzinger | ............. | H04R 19/04 |
| | | | | 205/775 |
| 2013/0133397 A1* | 5/2013 | Kim | ................... | G01C 19/5776 |
| | | | | 73/1.77 |
| 2015/0341018 A1* | 11/2015 | Hatori | ...................... | H03K 3/01 |
| | | | | 307/72 |
| 2016/0298966 A1 | 10/2016 | Ikehashi | | |
| 2016/0320187 A1* | 11/2016 | Higuchi | ............ | G01C 19/5776 |
| 2017/0023364 A1* | 1/2017 | Gregory | ................. | G01P 15/13 |
| 2017/0356928 A1* | 12/2017 | Bernal | ................. | G01P 15/125 |
| 2018/0274923 A1 | 9/2018 | Ikehashi | | |
| 2020/0067479 A1 | 2/2020 | Ikehashi | | |

OTHER PUBLICATIONS

Gando et al., "A Catch-and-Release Drive MEMS Gyroscope with Enhanced Sensitivity by Mode-Matching," Inertial Conference (2017), 4 pages.

Gando et al., "A MEMS Rate Integrating Gyroscope Based on Catch-and-Release Mechanism for Low-Noise Continuous Angle Measurement," MEMS (2018), pp. 944-947.

\* cited by examiner

SENSOR

CROSS-REFERENCE TO RELATED APPLICATIONS

This application is based upon and claims the benefit of priority from Japanese Patent Application No. 2019-092045, filed on May 15, 2019; the entire contents of which are incorporated herein by reference.

FIELD

Embodiments described herein relate generally to a sensor.

BACKGROUND

There is a sensor such as a gyro sensor or the like. It is desirable to increase the detection accuracy of the sensor.

DETAILED DESCRIPTION

Figure 1:
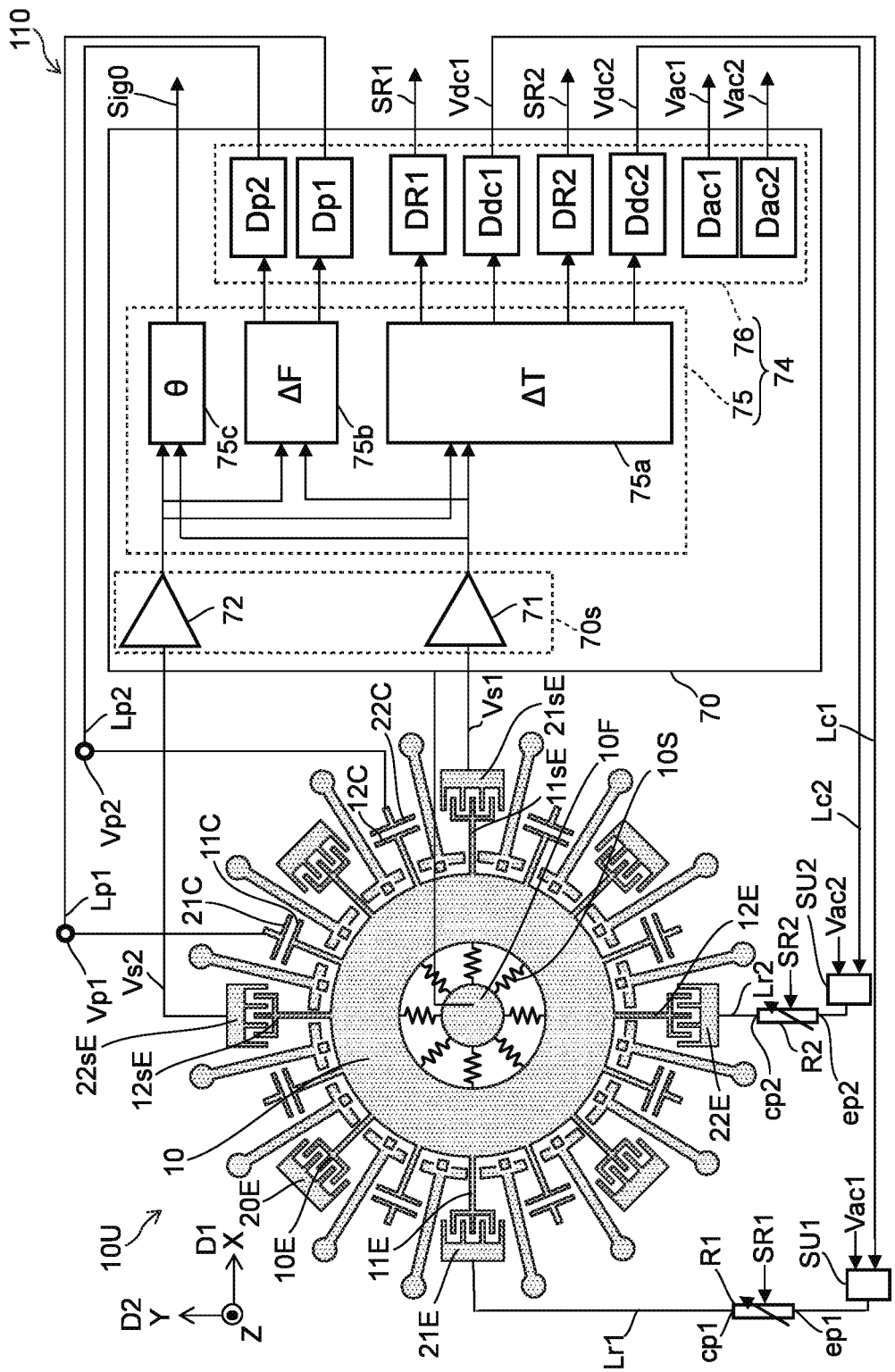
FIG. 1 is a schematic view illustrating a sensor according to a first embodiment.

According to one embodiment, a sensor includes a movable member, a first counter electrode, a second counter electrode, a first resistance, a second resistance, and a control device. The movable member includes a first electrode and a second electrode and is capable of vibrating. The vibration of the movable member includes a first component and a second component. The first component is along a first direction. The second component is along a second direction crossing the first direction. The first counter electrode opposes the first electrode. The second counter electrode opposes the second electrode. The first resistance includes a first end portion and a first other end portion. The second resistance includes a second end portion and a second other end portion. The first other end portion is electrically connected to the first counter electrode. The second other end portion is electrically connected to the second counter electrode. The control device includes a controller configured to perform at least a first operation. The first operation includes a first acquisition operation of acquiring the first component and the second component. The first operation includes a first modification operation of modifying at least one of a resistance value of the first resistance, a resistance value of the second resistance, a first voltage of the first end portion, or a second voltage of the second end portion to reduce an absolute value of a difference between a first time constant of the acquired first component and a second time constant of the acquired second component.

According to an embodiment, a sensor includes a movable member, a first counter electrode, a second counter electrode, a first resistance, a second resistance, a temperature sensor, and a control device. The movable member includes a first electrode and a second electrode and is capable of vibrating. The vibration of the movable member includes a first component and a second component. The first component is along a first direction. The second component is along a second direction crossing the first direction. The first counter electrode opposes the first electrode. The second counter electrode opposes the second electrode. The first resistance includes a first end portion and a first other end portion. The second resistance includes a second end portion and a second other end portion. The first other end portion is electrically connected to the first counter electrode. The first end portion is electrically connected to the control device. The second other end portion is electrically connected to the second counter electrode. The second end portion is electrically connected to the control device. The control device includes a controller configured to perform at least a first operation. The first operation includes modifying, based on a detected value detected by the temperature sensor, at least one of a resistance value of the first resistance, a resistance value of the second resistance, a first voltage of the first end portion, or a second voltage of the second end portion.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic view illustrating a sensor according to a first embodiment.

As shown in FIG. 1, the sensor 110 according to the embodiment includes a movable member 10, a first counter electrode 21E, a second counter electrode 22E, a first resistance R1, a second resistance R2, and a control device 70.

The movable member 10, the first counter electrode 21E, and the second counter electrode 22E are included in a sensor element 10U. The sensor element 10U is, for example, a "gyro element".

The movable member 10 includes a first electrode 11E and a second electrode 12E. The movable member 10 is capable of vibrating. The vibration of the movable member 10 includes a first component along a first direction D1, and a second component along a second direction D2. The second direction D2 crosses the first direction D1.

The first direction D1 is taken as an X-axis direction. One direction perpendicular to the X-axis direction is taken as a Y-axis direction. A direction perpendicular to the X-axis direction and the Y-axis direction is taken as a Z-axis direction. The second direction D2 is, for example, the Y-axis direction.

As shown in FIG. 1, the movable member 10 includes multiple electrodes 10E. One of the multiple electrodes 10E corresponds to the first electrode 11E. Another one of the multiple electrodes 10E corresponds to the second electrode 12E.

The sensor element 10U includes multiple counter electrodes 20E. One of the multiple counter electrodes 20E corresponds to the first counter electrode 21E. Another one of the multiple counter electrodes 20E corresponds to the second counter electrode 22E.

As shown in FIG. 1, the sensor element 10U further includes a support member 10S. The support member 10S supports the movable member 10. The support member 10S is deformable. The support member 10S is, for example, a spring mechanism.

A fixed member 10F is provided in the example. The fixed member 10F is fixed to a not-illustrated substrate, etc. One end of the support member 10S is connected to the fixed member 10F. Another end of the support member 10S is connected to the movable member 10. For example, multiple support members 10S may be provided; and the movable member 10 may be supported by the multiple support members 10S.

The position of the movable member 10 is changeable because the support member 10S is deformable. The change of the position of the movable member 10 includes, for example, a change of the position in the X-Y plane. The change of the position corresponds to the vibration of the movable member 10. The vibration includes the change of the position in the X-Y plane.

The sensor element 10U is, for example, a MEMS (micro electro mechanical systems) element.

In the example, the movable member 10 has a ring configuration. The fixed member 10F is in a hole of the ring-shaped movable member 10. The fixed member 10F is provided at the central portion in the X-Y plane of the movable member 10. The direction from the first electrode 11E toward the fixed member 10F crosses the direction from the second electrode 12E toward the fixed member 10F. The direction from the first electrode 11E toward the central portion in the X-Y plane of the movable member 10 crosses the direction from the second electrode 12E toward the central portion in the X-Y plane of the movable member 10.

The first counter electrode 21E opposes the first electrode 11E. The second counter electrode 22E opposes the second electrode 12E. One of the multiple counter electrodes 20E opposes one of the multiple electrodes 10E. The opposing direction includes a component along the X-Y plane.

In the example, a group that includes one of the multiple counter electrodes 20E and one of the multiple electrodes 10E has a comb electrode configuration.

The first resistance R1 includes a first end portion ep1 and a first other end portion cp1. The first other end portion cp1 is electrically connected to the first counter electrode 21E. For example, the first end portion ep1 is electrically connected to the control device 70. In the example, the first other end portion cp1 is electrically connected to the first counter electrode 21E by wiring Lr1.

A first adder SU1 is provided in the example. One end of wiring Lc1 is connected to one of multiple inputs of the first adder SU1. The other end of the wiring Lc1 is connected to the control device 70. A first alternating current voltage Vac1 (an alternating current signal) described below is supplied to another one of the multiple inputs of the first adder SU1. The first end portion ep1 is electrically connected to the control device 70 via the first adder SU1 and the wiring Lc1.

The second resistance R2 includes a second end portion ep2 and a second other end portion cp2. The second other end portion cp2 is electrically connected to the second counter electrode 22E. For example, the second end portion ep2 is electrically connected to the control device 70. In the example, the second other end portion cp2 is electrically connected to the second counter electrode 22E by wiring Lr2.

A second adder SU2 is provided in the example. One end of wiring Lc2 is connected to one of multiple inputs of the second adder SU2. The other end of the wiring Lc2 is connected to the control device 70. A second alternating current voltage Vac2 (an alternating current signal) described below is supplied to another one of the multiple inputs of the second adder SU2. The second end portion ep2 is electrically connected to the control device 70 via the second adder SU2 and the wiring Lc2.

At least one of the first resistance R1 or the second resistance R2 is a variable resistance. In the example, both the first resistance R1 and the second resistance R2 are variable resistances. The resistance of the first resistance R1 changes according to a control signal SR1 supplied to the first resistance R1. The resistance of the second resistance R2 changes according to a control signal SR2 supplied to the second resistance R2.

For example, an integrated circuit may be used as the first resistance R1 and the second resistance R2. For example, the first resistance R1 and the second resistance R2 may be formed in the substrate to which the fixed member 10F is fixed.

The control device 70 includes a controller 74. The controller 74 includes, for example, a calculator 75 and a driver part 76. For example, the calculation result of the calculator 75 is supplied to the driver part 76. Based on the calculation result, the driver part 76 outputs various voltages, etc. The various voltages include electrical signals.

In the example, the driver part 76 includes a control signal output part DR1, a control signal output part DR2, a voltage output part Ddc1, and a voltage output part Ddc2. The controller 74 (e.g., the control signal output part DR1) supplies the control signal SR1 to the first resistance R1. The controller 74 (e.g., the control signal output part DR2) supplies the control signal SR2 to the second resistance R2. The controller 74 (e.g., the voltage output part Ddc1) controls a first voltage Vdc1 of the first end portion ep1 of the first resistance R1. The controller 74 (e.g., the voltage output part Ddc2) controls a second voltage Vdc2 of the second end portion ep2 of the second resistance R2. The first voltage Vdc1 and the second voltage Vdc2 include direct current components.

For example, a capacitance element is formed of the first electrode 11E and the first counter electrode 21E. The first resistance R1 is connected in series to the capacitance element. For example, a first variable electric damper is formed of the first electrode 11E, the first counter electrode 21E, and the first resistance R1. For example, the capacitance of the capacitance element formed of the first electrode 11E and the first counter electrode 21E may change due to the first voltage Vdc1. For example, the first variable electric damper is formed of the first electrode 11E, the first counter electrode 21E, the first resistance R1, and the first voltage Vdc1.

For example, a capacitance element is formed of the second electrode 12E and the second counter electrode 22E. The second resistance R2 is connected in series to the capacitance element. For example, a second variable electric damper is formed of the second electrode 12E, the second counter electrode 22E, and the second resistance R2. For example, the capacitance of the capacitance element formed of the second electrode 12E and the second counter electrode 22E may change due to the second voltage Vdc2. For example, the second variable electric damper is formed of the second electrode 12E, the second counter electrode 22E, the second resistance R2, and the second voltage Vdc2.

The vibration characteristics of the movable member 10 can be changed by these variable electric dampers.

As described above, the direction from the first electrode 11E toward the central portion in the X-Y plane of the movable member 10 crosses the direction from the second electrode 12E toward the central portion in the X-Y plane of the movable member 10. For example, the direction of the displacement of the movable member 10 when the first voltage Vdc1 changes crosses the direction of the displacement of the movable member 10 when the second voltage Vdc2 changes. For example, the position of the movable member 10 changes along one of the X-axis direction or the Y-axis direction when the first voltage Vdc1 changes. For example, the position of the movable member 10 changes along the other of the X-axis direction or the Y-axis direction when the second voltage Vdc2 changes.

The time constant of the X-axis direction component of the vibration and the time constant of the Y-axis direction component of the vibration can be controlled by the first variable electric damper and the second variable electric damper such as those recited above. By controlling the time constants, a sensor can be provided in which the accuracy can be increased. Examples of controlling the time constants are described below.

In the example as described above, the first alternating current voltage Vac1 is input to the first adder SU1; and the second alternating current voltage Vac2 is input to the second adder SU2. For example, an alternating current voltage output part Dac1 and an alternating current voltage output part Dac2 are provided in the driver part 76 of the controller 74.

The first alternating current voltage Vac1 is output from the alternating current voltage output part Dac1. The first alternating current voltage Vac1 is applied to the first end portion ep1 of the first resistance R1 via the first adder SU1. The first alternating current voltage Vac1 is applied to the first counter electrode 21E via the first resistance R1. The alternating current component of the first alternating current voltage Vac1 is applied between the first counter electrode 21E and the first electrode 11E. Thereby, the movable member 10 vibrates along, for example, one direction according to the first alternating current voltage Vac1. The direction of the vibration includes, for example, a first direction D1 component.

The second alternating current voltage Vac2 is output from the alternating current voltage output part Dac2. The second alternating current voltage Vac2 is applied to the second end portion ep2 of the second resistance R2 via the second adder SU2. The second alternating current voltage Vac2 is applied to the second counter electrode 22E via the second resistance R2. The alternating current component of the second alternating current voltage Vac2 is applied between the second counter electrode 22E and the second electrode 12E. Thereby, the movable member 10 vibrates along, for example, another one direction according to the second alternating current voltage Vac2. The direction of the vibration includes, for example, a second direction D2 component.

Thus, the controller 74 causes the movable member 10 to vibrate by applying the first alternating current voltage Vac1 between the first electrode 11E and the first counter electrode 21E and applying the second alternating current voltage Vac2 between the second electrode 12E and the second counter electrode 22E. The direction of the vibration of the movable member 10 includes a first direction D1 component and a second direction D2 component.

The vibration state of the vibrating movable member 10 changes when rotated due to an external force, etc. A rotation angle θ can be detected by detecting the change of the vibration state. For example, the controller 74 can cause the movable member 10 to vibrate along an axis direction. For example, the controller 74 is capable of rotating the axis direction.

In the example as shown in FIG. 1, the movable member 10 includes a first detection electrode 11sE and a second detection electrode 12sE. For example, the direction from the first electrode 11E toward the first detection electrode 11sE (in the example, the X-axis direction) crosses the direction from the second electrode 12E toward the second detection electrode 12sE (in the example, the Y-axis direction).

On the other hand, the sensor element 10U includes a first detection counter electrode 21sE and a second detection counter electrode 22sE. The first detection counter electrode 21sE opposes the first detection electrode 11sE. The second detection counter electrode 22sE opposes the second detection electrode 12sE. For example, the first detection counter electrode 21sE and the first detection electrode 11sE have a comb electrode configuration. For example, the second detection counter electrode 22sE and the second detection electrode 12sE have a comb electrode configuration.

The control device 70 includes a first detector 71 and a second detector 72. The first detector 71 is electrically connected to the first detection counter electrode 21sE. The second detector 72 is electrically connected to the second detection counter electrode 22sE. The first detector 71 and the second detector 72 are included in a detector 70s. For example, the operations of the first detector 71 and the second detector 72 may be performed by one detector by using a differential circuit, etc. To simplify the description hereinbelow, an example will be described in which two detectors are provided.

For example, the first detector 71 applies a first detection voltage Vs1 to the first detection counter electrode 21sE. A signal that corresponds to the amplitude of the vibration along the first direction D1 is detected using the capacitive coupling between the first detection counter electrode 21sE and the first detection electrode 11sE. For example, the second detector 72 applies a second detection voltage Vs2 to the second detection counter electrode 22sE. A signal that corresponds to the amplitude of the vibration along the second direction D2 is detected using the capacitive coupling between the second detection counter electrode 22sE and the second detection electrode 12sE.

Thus, the first detector 71 detects a first amplitude of the first component along the first direction D1 of the vibration of the movable member 10. The second detector 72 detects a second amplitude of the second component along the second direction D2 of the vibration of the movable member 10.

The amplitudes that are detected by the first detector 71 and the second detector 72 are supplied to the calculator 75 of the controller 74. The calculator 75 includes, for example, a part (e.g., a rotation angle derivation part 75c) deriving the rotation angle θ. Data that relates to the rotation angle θ derived by the rotation angle derivation part 75c is output as a signal Sig0 from the control device 70 (e.g., the controller 74).

Thus, based on the first component along the first direction D1 of the vibration and the second component along the second direction D2 of the vibration, the controller 74 can output the signal Sig0 corresponding to the rotation angle θ of the movable member 10.

As described above, the vibration state changes when the vibrating movable member 10 is rotated by an external force, etc. It is considered that the change of the vibration state is, for example, an action of a Coriolis force. For example, the movable member 10 vibrates due to the spring mechanism (e.g., the support member 10S). A Coriolis force due to an angular velocity Ω of rotation acts on the movable member 10 vibrating in the first direction D1. Thereby, a component of a vibration along the second direction D2 is generated in the movable member 10. The second detector 72 detects the amplitude of the vibration along the second direction D2. On the other hand, a Coriolis force due to the angular velocity Ω of rotation acts on the movable member 10 vibrating in the second direction D2. Thereby, a component of a vibration along the first direction D1 is generated in the movable member 10. The first detector 71 detects the amplitude of the vibration along the first direction D1. For example, the rotation angle θ corresponds to $\tan^{-}(-Ay/Ax)$, wherein "Ax" is the amplitude of the first component in the first direction D1, and "Ay" is the amplitude of the second component in the second direction D2.

The controller 74 acquires the first component from the first detector 71 and acquires the second component from the second detector 72. The signal Sig0 that corresponds to the rotation angle θ from the calculation of the controller 74 is output from the controller 74.

Here, for example, it is considered that high accuracy of the calculated rotation angle θ is obtained when the first component in the first direction D1 and the second component in the second direction D2 are substantially the same and the movable member 10 is not rotating. However, for example, due to the fluctuation in the manufacturing processes, etc., the amplitude of the vibration is not always uniform along the two directions. Also, there are cases where the amplitude of the vibration is nonuniform due to a temperature change, etc. It is considered that the detection accuracy may decrease in such cases.

In the embodiment, for example, the controller 74 of the control device 70 performs a first operation described below. The first operation is, for example, a correction operation. For example, the vibration of the movable member 10 easily becomes uniform in the X-Y plane due to the first operation. A sensor can be provided in which the accuracy can be increased. For example, at least a portion of the first operation is performed by one part (a time constant adjuster 75a referring to FIG. 1) of the calculator 75 of the controller 74, etc. An example of the first operation will now be described.

Figure 2:
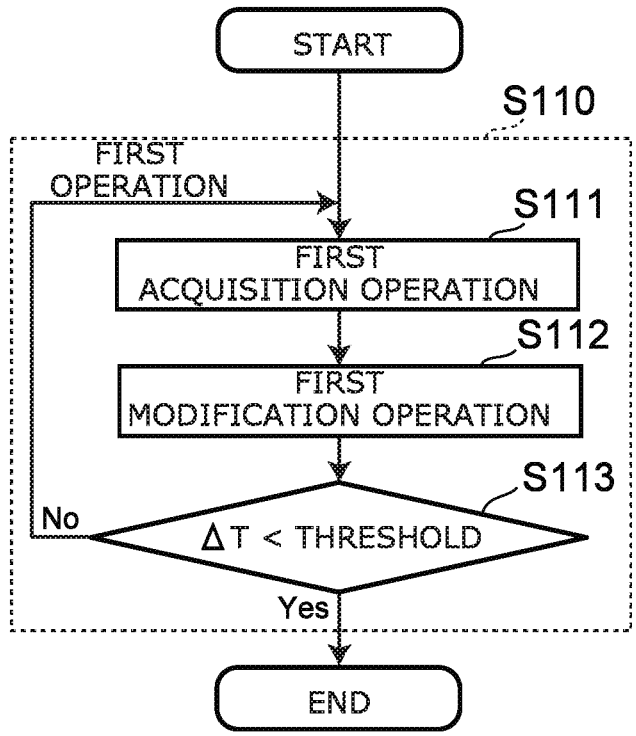
FIG. 2 is a flowchart illustrating the operation of the sensor according to the first embodiment.

FIG. 2 is a flowchart illustrating the operation of the sensor according to the first embodiment.

For example, the operation illustrated in FIG. 2 is performed by the controller 74 of the control device 70.

As shown in FIG. 2, the controller 74 can perform the first operation (step S110). The first operation includes a first acquisition operation (step S111) and a first modification operation (step S112).

In the first acquisition operation, the controller 74 acquires the first component along the first direction D1 of the vibration of the movable member 10 and the second component along the second direction D2 of the vibration of the movable member 10. For example, as described above, the controller 74 acquires the first component from the first detector 71 and acquires the second component from the second detector 72. The first component corresponds to the amplitude along the first direction D1. The second component corresponds to the amplitude along the second direction D2.

In the first modification operation, the controller 74 modifies at least one of the resistance value of the first resistance R1, the resistance value of the second resistance R2, the first voltage Vdc1 of the first end portion ep1, or the second voltage Vdc2 of the second end portion ep2 to reduce the absolute value of a difference ΔT between a first time constant of the acquired first component and a second time constant of the acquired second component.

The absolute value of the difference ΔT between the first time constant and the second time constant is reduced by the first modification operation. The nonuniformity in the X-Y plane of the vibration of the movable member 10 is suppressed thereby. Thereby, a sensor can be provided in which the accuracy can be increased.

After the first modification operation as shown in FIG. 2, for example, the difference ΔT is compared to a determined threshold (step S113). The flow ends when the difference ΔT is less than the threshold. The flow returns to step S111 when the difference ΔT is not less than the threshold. Thus, the controller 74 may perform the first operation repeatedly. For example, the first operation is a constantly automatic operation using a closed loop.

Figure 3A:
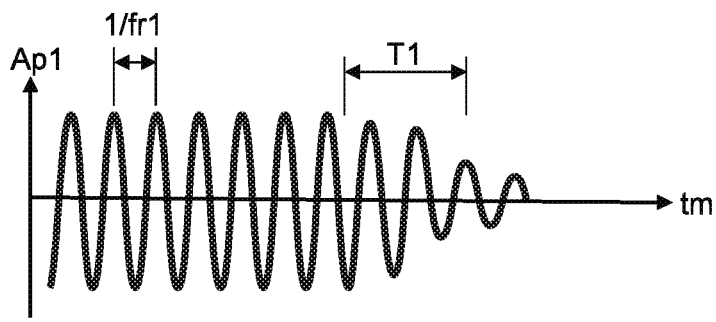
FIG. 3A and FIG. 3B are schematic views illustrating the operation of the sensor according to the first embodiment.
Figure 3B:
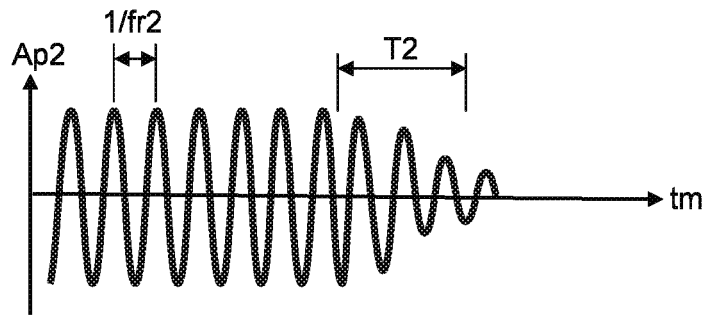

FIG. 3A and FIG. 3B are schematic views illustrating the operation of the sensor according to the first embodiment.

FIG. 3A corresponds to the first component along the first direction D1 of the amplitude of the vibration. FIG. 3B corresponds to the second component along the second direction D2 of the amplitude of the vibration. In these drawings, the horizontal axis corresponds to a time tm. The vertical axis of FIG. 3A corresponds to a strength Ap1 of the first component. The vertical axis of FIG. 3B corresponds to a strength Ap2 of the second component.

As shown in FIG. 3A, the first component in the first direction D1 has a first resonant frequency fr1 and a first time constant T1 (a first attenuation time constant). The first time constant T1 is the time to reach 1/e from the strength Ap1 before attenuation. "e" is the base of the natural logarithm.

As shown in FIG. 3B, the second component in the second direction D2 has a second resonant frequency fr2 and a second time constant T2 (a second attenuation time constant). The second time constant T2 is the time to reach 1/e from the strength Ap2 before attenuation.

The difference ΔT corresponds to the difference between the first time constant T1 and the second time constant T2. As shown in FIG. 3A and FIG. 3B, the first time constant T1 is not always the same as the second time constant T2. The difference ΔT is not always 0. For example, these time constants are affected by the manufacturing fluctuation of the sensor element 10U, etc. These time constants also change due to the temperature.

For example, the first time constant T1 can be modified by the first voltage Vdc1 or the value of the first resistance R1. For example, the second time constant T2 can be modified by the second voltage Vdc2 or the value of the second resistance R2.

In the embodiment, at least one of the resistance value of the first resistance R1, the resistance value of the second resistance R2, the first voltage Vdc1 of the first end portion ep1, or the second voltage Vdc2 of the second end portion ep2 is modified. The difference $\Delta T$ is reduced thereby. The nonuniformity of the vibration in the first direction D1 and the second direction D2 can be suppressed thereby. According to the embodiment, the accuracy of the detection can be increased.

For example, the first component that is detected by the first detector 71 and the second component that is detected by the second detector 72 are supplied to the time constant adjuster 75a illustrated in FIG. 1. A value that relates to at least one of the first resistance R1, the second resistance R2, the first voltage Vdc1, or the second voltage Vdc2 is calculated by the time constant adjuster 75a to reduce the difference $\Delta T$. The calculation result is supplied to the driver part 76. Based on the calculated value, the control signal SR1 of the first resistance R1, the control signal SR2 of the second resistance R2, the first voltage Vdc1, and the second voltage Vdc2 are output from the driver part 76. At least one of the control signal SR1, the control signal SR2, the first voltage Vdc1, or the second voltage Vdc2 is modified based on the value calculated to reduce the difference $\Delta T$.

Figure 4A:
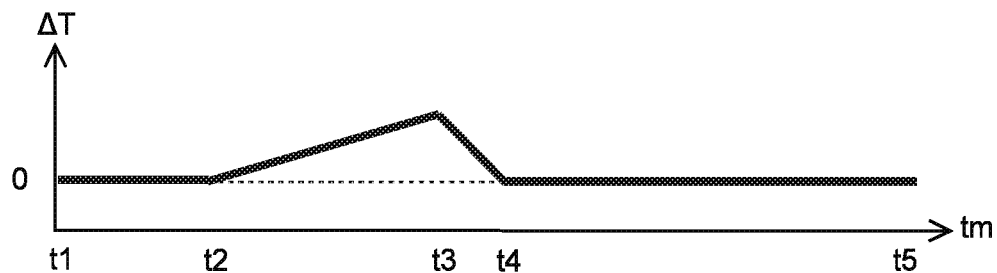
FIG. 4A and FIG. 4B are schematic views illustrating the operation of the sensor according to the first embodiment.
Figure 4B:
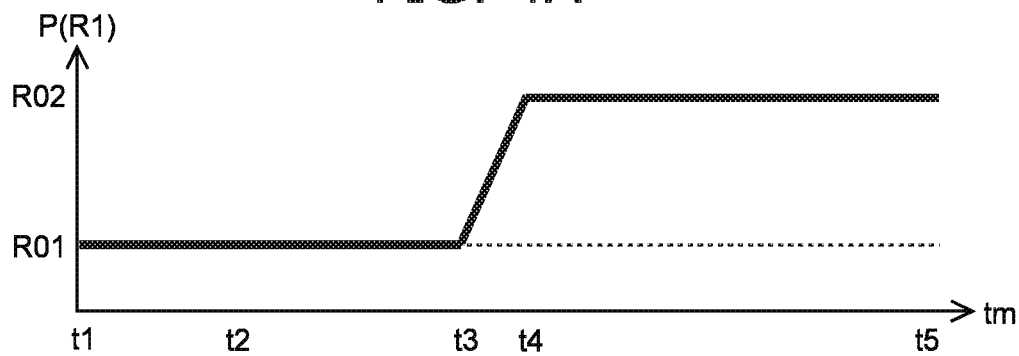

An example in which the first resistance R1 is modified to reduce the difference $\Delta T$ will now be described. FIG. 4A and FIG. 4B are schematic views illustrating an operation of the sensor according to the first embodiment.

In these drawings, the horizontal axis is the time tm. The vertical axis of FIG. 4A is the difference $\Delta T$. FIG. 4B is a resistance value P (R1) of the first resistance R1.

As shown in FIG. 4A, the difference $\Delta T$ is substantially 0 in the period from a time t1 to a time t2. As shown in FIG. 4B, the resistance value P (R1) has a value R01 in this period.

As shown in FIG. 4A, the difference $\Delta T$ increases after the time t2. For example, the increase of the difference $\Delta T$ is due to a change of the temperature, etc.

As shown in FIG. 4B, the first operation recited above is performed at a time t3. For example, the resistance value P (R1) is changed from the value R01 toward a value R02. Accordingly, the difference $\Delta T$ decreases as shown in FIG. 4A.

At and after a time t4, the resistance value P (R1) has the value R02 as shown in FIG. 4B. As shown in FIG. 4A, the difference $\Delta T$ is substantially 0. The difference $\Delta T$ is maintained at 0 even at a time t5.

In the embodiment, the first operation may be performed repeatedly in the period from the time t3 to the time t4. The difference $\Delta T$ may be substantially 0 due to performing the first operation one time. By such a first operation, the nonuniformity of the vibration in the first direction D1 and the second direction D2 can be suppressed. The accuracy of the detection can be increased.

On the other hand, the first component has the first resonant frequency fr1; and the second component has the second resonant frequency fr2. The first resonant frequency fr1 and the second resonant frequency fr2 are not always the same. A difference $\Delta F$ between the first resonant frequency fr1 and the second resonant frequency fr2 is not always 0. These resonant frequencies are affected by the manufacturing fluctuation of the sensor element 10U, etc. These resonant frequencies also change according to the temperature.

In the embodiment, an operation (e.g., a second operation) may be performed to reduce the difference $\Delta F$ between the first resonant frequency fr1 and the second resonant frequency fr2. For example, at least a portion of the second operation is performed by one part (a resonant frequency adjuster 75b referring to FIG. 1) of the calculator 75 of the controller 74, etc. An example of the second operation will now be described.

For example, as shown in FIG. 1, the sensor 110 may further include a first counter conductive portion 21C and a second counter conductive portion 22C. For example, the first counter conductive portion 21C and the second counter conductive portion 22C are included in the sensor element 10U. The movable member 10 may further include a first conductive portion 11C and a second conductive portion 12C. The first counter conductive portion 21C opposes the first conductive portion 11C. The second counter conductive portion 22C opposes the second conductive portion 12C. In the example, the group of the first counter conductive portion 21C and the first conductive portion 11C and the group of the second counter conductive portion 22C and the second conductive portion 12C each correspond to a parallel-plate electrode pair.

For example, the driver part 76 includes a voltage output part Dp1 and a voltage output part Dp2. For example, the voltage output part Dp1 is connected to the first counter conductive portion 21C by wiring Lp1. For example, the voltage output part Dp2 is connected to the second counter conductive portion 22C by wiring Lp2. A first counter conductive portion voltage Vp1 is applied to the first counter conductive portion 21C by the voltage output part Dp1. A second counter conductive portion voltage Vp2 is applied to the second counter conductive portion 22C by the voltage output part Dp2.

The resonant frequency of the vibration of the movable member 10 can be controlled by the first counter conductive portion voltage Vp1 and the second counter conductive portion voltage Vp2. For example, a first variable electric spring is formed of the first conductive portion 11C, the first counter conductive portion 21C, and the first counter conductive portion voltage Vp1. For example, a second variable electric spring is formed of the second conductive portion 12C, the second counter conductive portion 22C, and the second counter conductive portion voltage Vp2. The directions of these variable electric springs cross each other.

For example, the direction of the displacement of the movable member 10 when the first counter conductive portion voltage Vp1 changes crosses the direction of the displacement of the movable member 10 when the second counter conductive portion voltage Vp2 changes. The resonant frequency can be controlled in any direction by the multiple variable electric springs corresponding to the displacements of the multiple directions. Several examples of the second operation will now be described.

As described above, the acquired first component has the first resonant frequency fr1; and the acquired second component has the second resonant frequency fr2.

Figure 5:
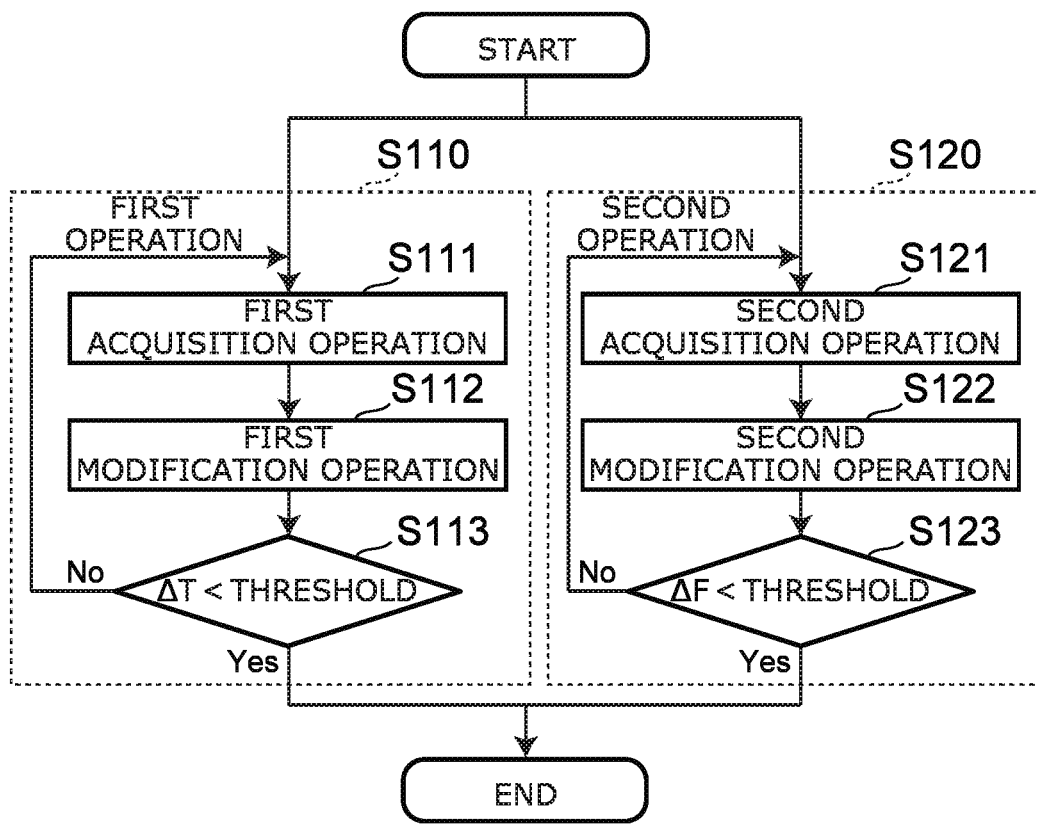
FIG. 5 is a flowchart illustrating an operation of the sensor according to the first embodiment.

FIG. 5 is a flowchart illustrating an operation of the sensor according to the first embodiment.

For example, the operation illustrated in FIG. 5 is performed by the controller 74 of the control device 70.

As shown in FIG. 5, the controller 74 can perform the second operation (step S120). The second operation includes a second acquisition operation (step S121) and a second modification operation (step S122).

In the second acquisition operation, the controller 74 acquires the first component along the first direction D1 of the amplitude of the vibration and the second component along the second direction D2 of the amplitude of the vibration.

In the second modification operation, at least one of the first counter conductive portion voltage Vp1 of the first counter conductive portion 21C or the second counter conductive portion voltage Vp2 of the second counter conductive portion 22C is modified to reduce the absolute value of the difference ΔF between the first resonant frequency fr1 of the acquired first component and the second resonant frequency fr2 of the acquired second component.

The difference (the difference ΔF) in the in-plane direction of the resonant frequency can be reduced thereby. The accuracy can be improved further.

As shown in FIG. 5, for example, the difference ΔF is compared to a determined threshold (step S123). The flow ends when the difference ΔF is less than the threshold. The flow returns to step S121 when the difference ΔF is not less than the threshold. Thus, the controller 74 may perform the second operation repeatedly. For example, the second operation is a constantly automatic operation using a closed loop.

In the example of FIG. 5, the first operation and the second operation are performed in parallel. At least a portion of the first operation and at least a portion of the second operation may be performed simultaneously. The second operation may be performed after the first operation ends. The sequence of the first operation and the second operation may be interchanged.

The second modification operation recited above may be included in the first operation.

Figure 6:
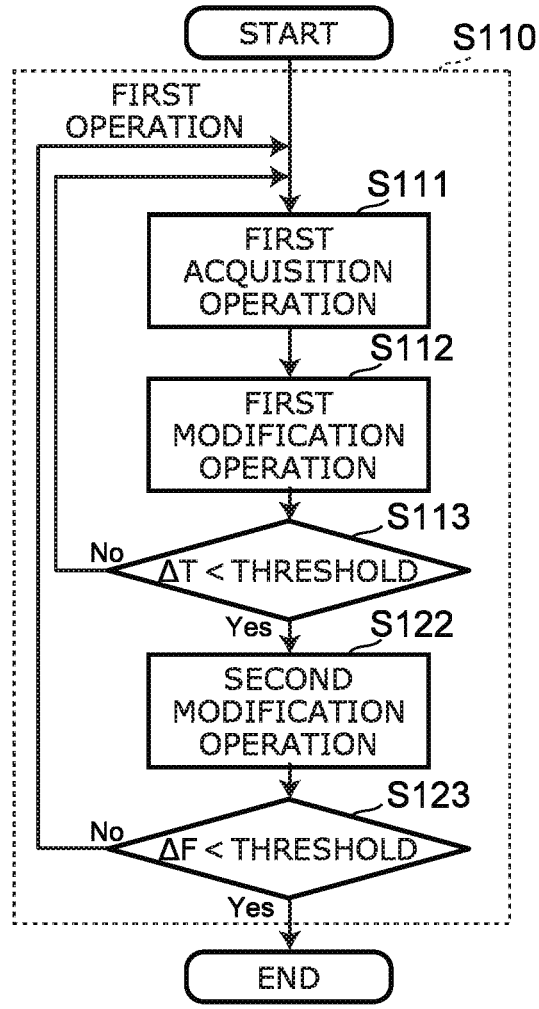
FIG. 6 is a flowchart illustrating an operation of the sensor according to the first embodiment.

FIG. 6 is a flowchart illustrating an operation of the sensor according to the first embodiment.

For example, the operation illustrated in FIG. 6 is performed by the controller 74 of the control device 70.

As shown in FIG. 6, the first operation (step S110) may further include the second modification operation (step S122) in addition to the first acquisition operation (step S111), the first modification operation (step S112), and step S113. In such a case, the second acquisition operation is omitted. In the example, the first operation may further include step S123. In the example, the controller 74 reduces the difference ΔF relating to the resonant frequency after reducing the difference ΔT relating to the time constant. Such a first operation may be performed repeatedly. In the embodiment, the sequence of the first modification operation and the second modification operation may be interchanged.

Figure 7:
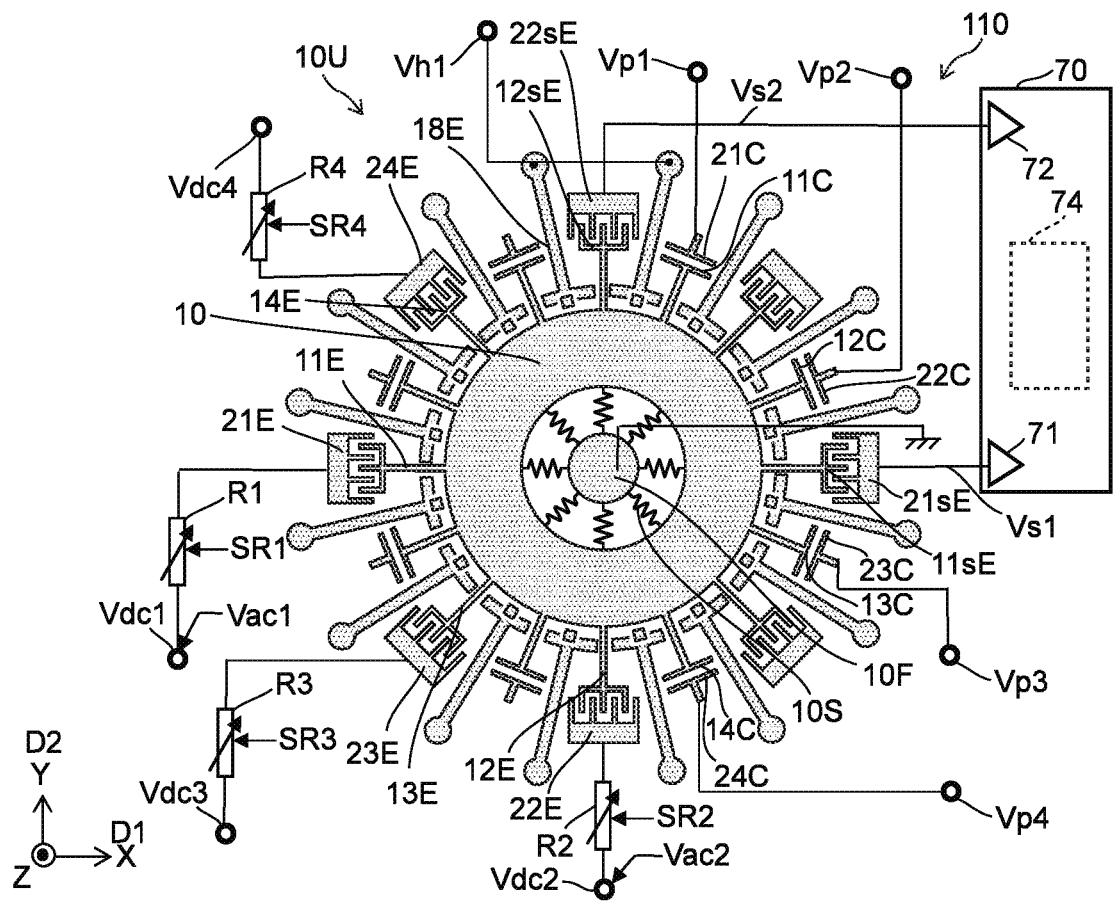
FIG. 7 is a schematic view illustrating the sensor according to the first embodiment.

FIG. 7 is a schematic view illustrating the sensor according to the first embodiment.

As shown in FIG. 7, the movable member 10 may further include a third electrode 13E and a fourth electrode 14E. The sensor element 10U may further include a third counter electrode 23E and a fourth counter electrode 24E. The third counter electrode 23E opposes the third electrode 13E. The fourth counter electrode 24E opposes the fourth electrode 14E. The sensor 110 includes a third resistance R3 and a fourth resistance R4. The third resistance R3 and the fourth resistance R4 are variable resistances. One end of the third resistance R3 is connected to the third counter electrode 23E. An "other end" of the third resistance R3 is electrically connected to the controller 74. One end of the fourth resistance R4 is connected to the fourth counter electrode 24E. An "other end" of the fourth resistance R4 is electrically connected to the controller 74. A group that includes the third electrode 13E and the third counter electrode 23E has a comb electrode configuration. A group that includes the fourth electrode 14E and the fourth counter electrode 24E has a comb electrode configuration.

The controller 74 supplies a control signal SR3 to the third resistance R3. The resistance of the third resistance R3 changes according to the control signal SR3. The controller 74 supplies a control signal SR4 to the fourth resistance R4. The resistance of the fourth resistance R4 changes according to the control signal SR4.

The controller 74 applies a third voltage Vdc3 to the "other end" of the third resistance R3 recited above. The controller 74 applies a fourth voltage Vdc4 to the "other end" of the fourth resistance R4 recited above. The controller 74 may modify at least one of the resistance value of the third resistance R3, the resistance value of the fourth resistance R4, the third voltage Vdc3, or the fourth voltage Vdc4 to reduce the difference ΔT.

As shown in FIG. 7, the sensor 110 may further include a third counter conductive portion 23C and a fourth counter conductive portion 24C. For example, the third counter conductive portion 23C and the fourth counter conductive portion 24C are included in the sensor element 10U. The movable member 10 may further include a third conductive portion 13C and a fourth conductive portion 14C. The third counter conductive portion 23C opposes the third conductive portion 13C. The fourth counter conductive portion 24C opposes the fourth conductive portion 14C. In the example, a group of the third counter conductive portion 23C and the third conductive portion 13C and a group of the fourth counter conductive portion 24C and the fourth conductive portion 14C each correspond to a parallel-plate electrode pair.

For example, the controller 74 applies a third counter conductive portion voltage Vp3 to the third counter conductive portion 23C. The controller 74 applies a fourth counter conductive portion voltage Vp4 to the fourth counter conductive portion 24C. The controller 74 may further control the resonant frequency of the vibration of the movable member 10 using the third counter conductive portion voltage Vp3 and the fourth counter conductive portion voltage Vp4.

For example, the first to fourth voltages Vdc1 to Vdc4 recited above are voltages for time constant control and include direct current components. For example, the first to fourth counter conductive portion voltages Vp1 to Vp4 recited above are voltages for resonant frequency control and include direct current components. The first alternating current voltage Vac1 and the second alternating current voltage Vac2 are voltages for driving and include alternating current components. For example, the first to fourth resistances R1 to R4 are variable resistances for time constant control. The first detection voltage Vs1 and the second detection voltage Vs2 are detection voltages. For example, one differential circuit may be used as the first detector 71 and the second detector 72.

As shown in FIG. 7, another electrode 18E may be provided in the sensor 110. A voltage Vhf or the like may be applied to the other electrode 18E by the control device 70. An operation that is different from the operations recited above may be performed using the other electrode 18E.

Figure 8:
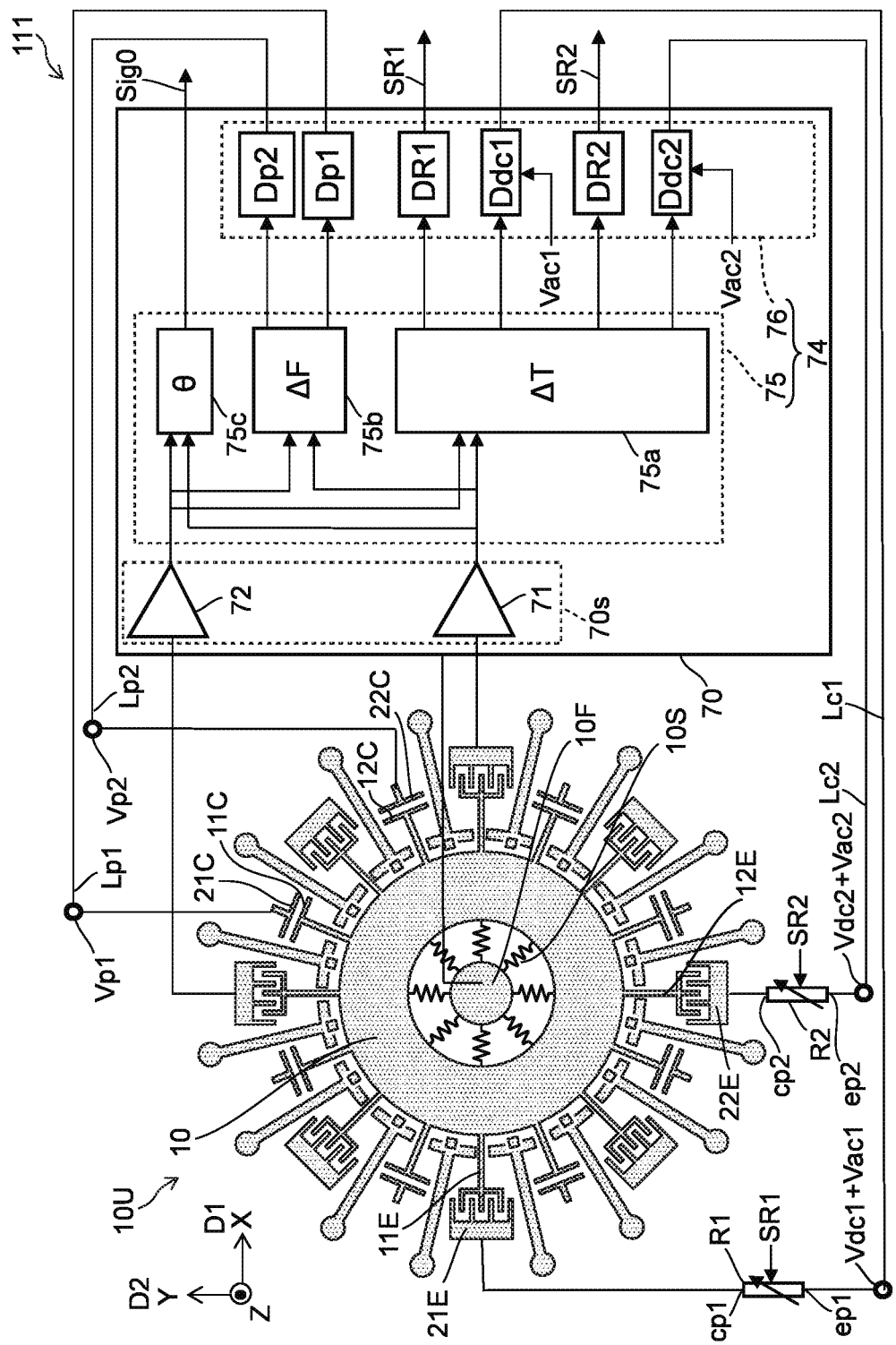
FIG. 8 is a schematic view illustrating a sensor according to the first embodiment.

FIG. 8 is a schematic view illustrating a sensor according to the first embodiment.

In the sensor 111 according to the embodiment as shown in FIG. 8, the voltage output part Ddc1 and the voltage output part Ddc2 that are included in the driver part 76 of the controller 74 include, for example, the functions of adders.

For example, a signal of the sum of the first voltage Vdc1 and the first alternating current voltage Vac1 is obtained in the voltage output part Ddc1. This signal is supplied to the first end portion ep1 of the first resistance R1. For example, a signal of the sum of the second voltage Vdc2 and the second alternating current voltage Vac2 is obtained in the voltage output part Ddc2. This signal is supplied to the second end portion ep2 of the second resistance R2. Otherwise, the configuration of the sensor 111 is similar to the configuration of the sensor 110.

In the sensor 111 as well, the controller 74 performs the first operation recited above. The controller 74 may further perform the second operation recited above. In the sensor 111 as well, a sensor can be provided in which the accuracy can be increased.

In the sensors 110 and 111 recited above, alternating current voltages for driving are applied to the first counter electrode 21E and the second counter electrode 22E used to adjust the time constants. In the embodiment, the electrodes to which the alternating current voltages for driving are applied may be provided separately from the electrodes used to adjust the time constants. An example will now be described.

Figure 9:
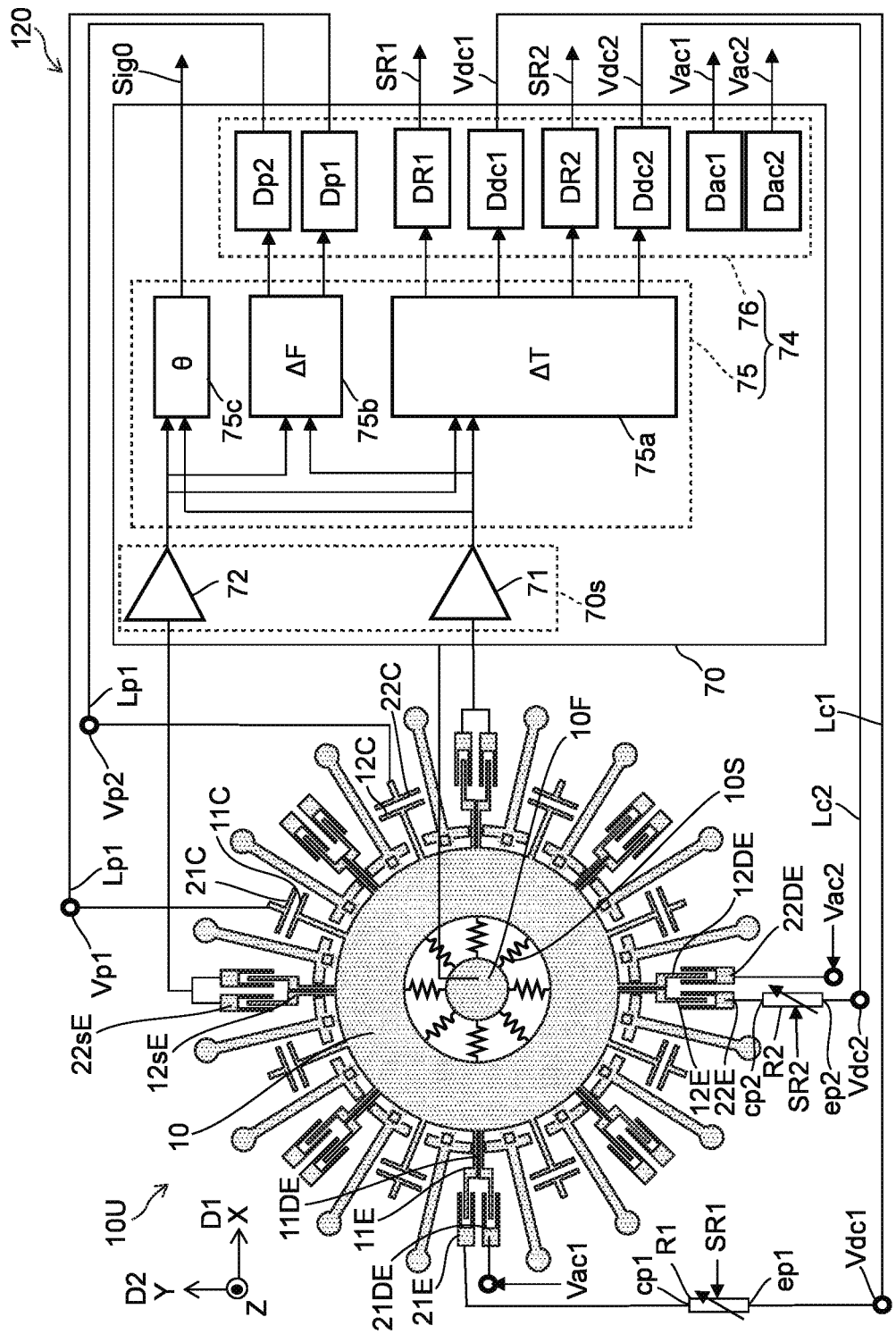
FIG. 9 is a schematic view illustrating a sensor according to the first embodiment.

FIG. 9 is a schematic view illustrating a sensor according to the first embodiment.

As shown in FIG. 9, the sensor 120 according to the embodiment includes a first drive counter electrode 21DE in addition to the first counter electrode 21E and the second counter electrode 22E. The movable member 10 includes a first drive electrode 11DE in addition to the first electrode 11E and the second electrode 12E. The first drive counter electrode 21DE opposes the first drive electrode 11DE. The controller 74 causes the movable member 10 to vibrate by applying the first alternating current voltage Vac1 between the first drive electrode 11DE and the first drive counter electrode 21DE. In such a case, the controller 74 applies the first voltage Vdc1 to the first end portion ep1 of the first resistance R1.

The sensor 120 may further include a second drive counter electrode 22DE. The movable member 10 includes a second drive electrode 12DE. The second drive counter electrode 22DE opposes the second drive electrode 12DE. The controller 74 causes the movable member 10 to vibrate by applying the second alternating current voltage Vac2 between the second drive electrode 12DE and the second drive counter electrode 22DE. The controller 74 applies the second voltage Vdc2 to the second end portion ep2 of the second resistance R2.

The direction of the vibration of the movable member 10 due to the first alternating current voltage Vac1 crosses the direction of the vibration of the movable member 10 due to the second alternating current voltage Vac2. The controller 74 can cause the movable member 10 to vibrate along an axis direction. The controller 74 is capable of rotating the axis direction.

Thus, the electrodes to which the alternating current voltages for driving are applied may be provided separately from the electrodes used to adjust the time constants. In the sensor 120 as well, the controller 74 performs the first operation recited above. The controller 74 may further perform the second operation recited above. In the sensor 120 as well, a sensor can be provided in which the accuracy can be increased.

An example of the first operation and the second operation will now be described.

Figure 10:
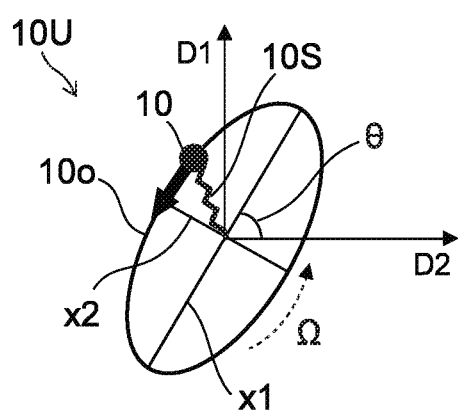
FIG. 10 is a schematic view illustrating the operation of the sensor according to the first embodiment.

FIG. 10 is a schematic view illustrating the operation of the sensor according to the first embodiment.

FIG. 10 schematically illustrates the vibration of the movable member 10 included in the sensor element 10U. As shown in FIG. 10, the movable member 10 which is supported by the support member 10S vibrates substantially along an elliptical path 10o. In other words, an elliptical vibration is generated. The angular velocity $\Omega$ is applied to the movable member 10. The rotation angle $\theta$ corresponds to an integral relating to the time of the angular velocity $\Omega$.

The elliptical path 10o has a first length x1 in the major-axis direction of the elliptical path 10o and a second length x2 in the minor-axis direction of the elliptical path 10o. Here, a first value E is taken as $(x1)^2+(x2)^2$. A second value Q is taken as the product of x1 and x2 (i.e., $x1 \times x2$). The first value E corresponds to the total energy of the elliptical vibration. The second value Q corresponds to the minor axis energy of the elliptical vibration. The control described below is performed using such a first value E and such a second value Q.

Figure 11:
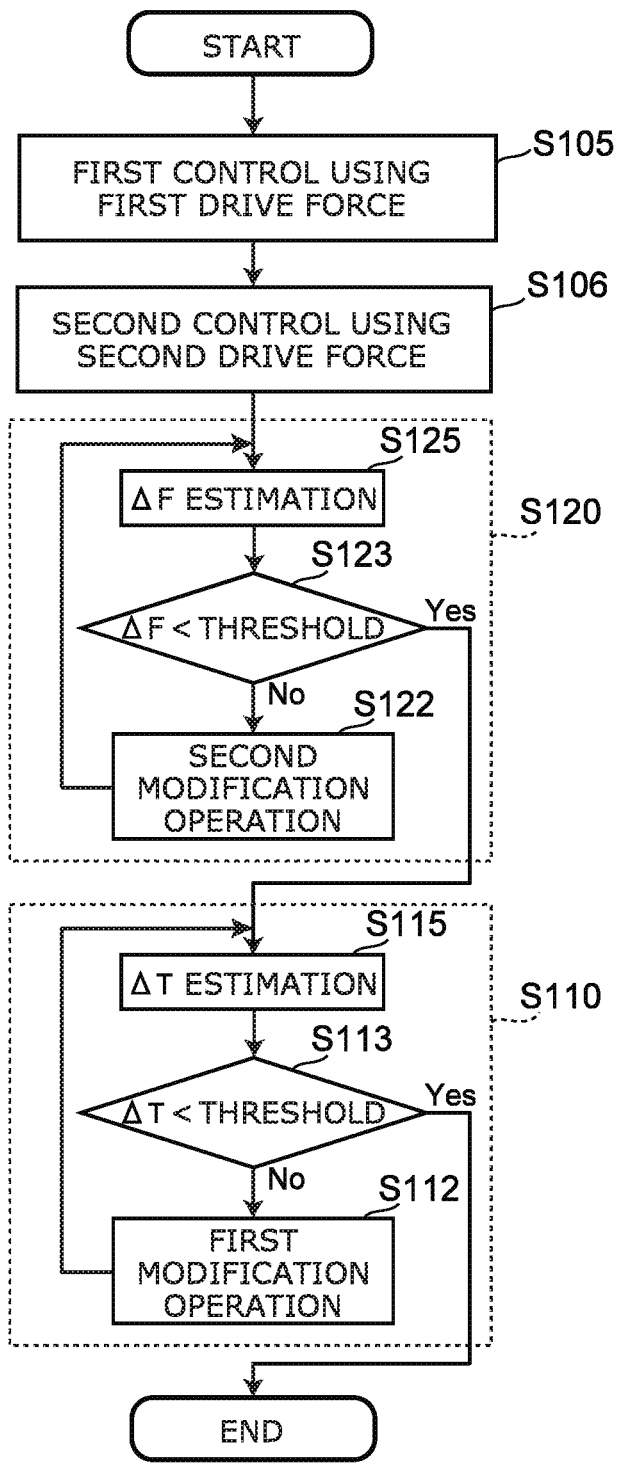
FIG. 11 is a flowchart illustrating the operation of the sensor according to the first embodiment.

FIG. 11 is a flowchart illustrating the operation of the sensor according to the first embodiment.

As shown in FIG. 11, a first drive force Fe is applied to the movable member 10; and a closed loop of a first control operation is performed to maintain the first value E to be constant (step S105). The first control operation is performed based on the amplitude along the first direction D1 and the vibration along the second direction D2 of the movable member 10 detected by the detector 70s (the first detector 71 and the second detector 72).

As shown in FIG. 11, a second drive force Fq is applied to the movable member 10; and a closed loop of a second control operation is performed to maintain the second value Q to be constant (step S106).

Thus, the controller 74 may perform the first control operation and the second control operation. In the first control operation, the controller 74 acquires the first value E, supplies the first drive force Fe to the movable member 10, and maintains the first value E to be constant. In the second control operation, the controller 74 acquires the second value Q, supplies the second drive force Fq to the movable member 10, and maintains the second value Q to be constant.

Subsequently, for example, the controller 74 estimates the difference $\Delta F$ between the first resonant frequency fr1 and the second resonant frequency fr2 (step S125). An example of the estimation of the difference $\Delta F$ is described below.

The difference $\Delta F$ is compared to a determined threshold (step S123). The flow proceeds to step S110 when the difference $\Delta F$ is less than the threshold. The second modification operation (step S122) is performed when the difference $\Delta F$ is not less than the threshold. Subsequently, the flow returns to step S125.

In step S110, for example, the controller 74 estimates the difference $\Delta T$ between the first time constant T1 and the second time constant T2 (step S115). An example of the estimation of the difference $\Delta T$ is described below.

The difference $\Delta T$ is compared to a determined threshold (step S113). The flow ends when the difference $\Delta F$ is less than the threshold. The first modification operation (step S112) is performed when the difference $\Delta T$ is not less than the threshold. Subsequently, the flow returns to step S115.

Several examples of the estimation of the difference $\Delta F$ (step S125) will now be described.

Figure 12:
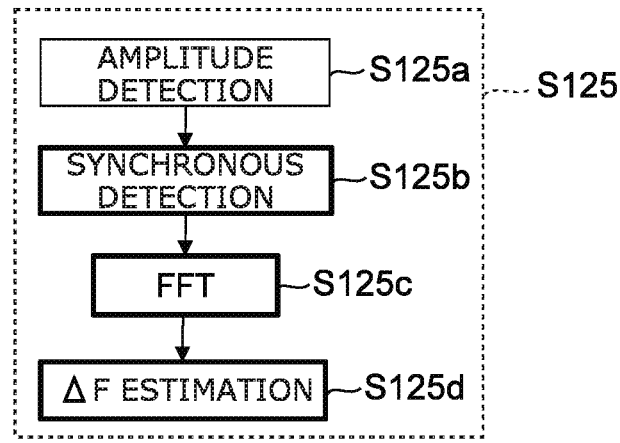
FIG. 12 is a flowchart illustrating the operation of the sensor according to the first embodiment.

FIG. 12 is a flowchart illustrating the operation of the sensor according to the first embodiment.

FIG. 12 shows one example relating to the estimation of the difference $\Delta F$ (step S125). For example, the amplitude in the first direction D1 and the amplitude in the second direction D2 are detected (step S125a). Synchronous detection of the output in the first direction D1 and the output in the second direction D2 for the first resonant frequency fr1 is performed (step S125b). For example, the resonant frequencies (the first resonant frequency fr1 and the second resonant frequency fr2) are characteristics unique to the sensor element 10U; and these resonant frequencies can be adjusted by voltages in the embodiment.

As shown in FIG. 12, FFT (Fast Fourier Transform) analysis is performed (step S125c). The FFT analysis is performed constantly (continuously or repeatedly). The difference ΔF can be estimated from the result of the FFT analysis (step S125d).

Figure 13:
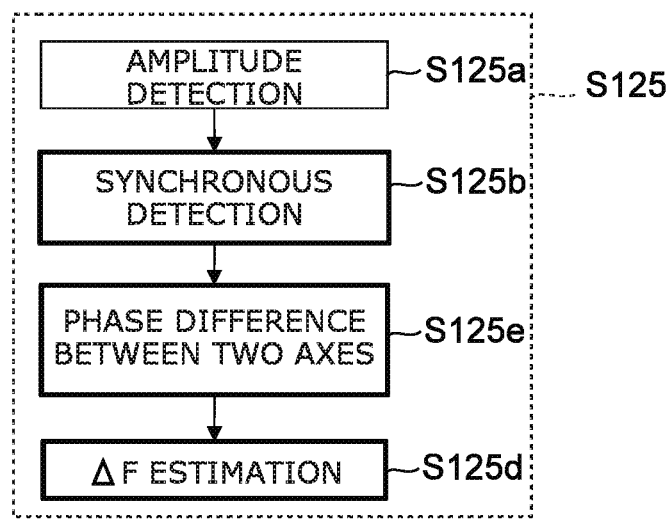
FIG. 13 is a flowchart illustrating an operation of the sensor according to the first embodiment.

FIG. 13 is a flowchart illustrating an operation of the sensor according to the first embodiment.

FIG. 13 shows another example relating to the estimation of the difference ΔF (step S125). For example, the amplitude in the first direction D1 and the amplitude in the second direction D2 are detected (step S125a). Synchronous detection of the output in the first direction D1 and the output in the second direction D2 for the first resonant frequency fr1 is performed (step S125b).

As shown in FIG. 13, the phase difference between the two axes is detected (step S125e). For example, the two axes correspond to the major axis and the minor axis of the elliptical path 10o. For example, the phase difference between the two axes corresponds to the phase difference between the first direction D1 and the second direction D2. The difference ΔF can be estimated based on the phase difference between the two axes (step S125d). In the case where the second direction D2 is perpendicular to the first direction D1, the phase difference between the two axes is 0 when ΔF is 0. The difference ΔF can be estimated utilizing this characteristic.

An example of the estimation of the difference ΔT will now be described.

Figure 14:
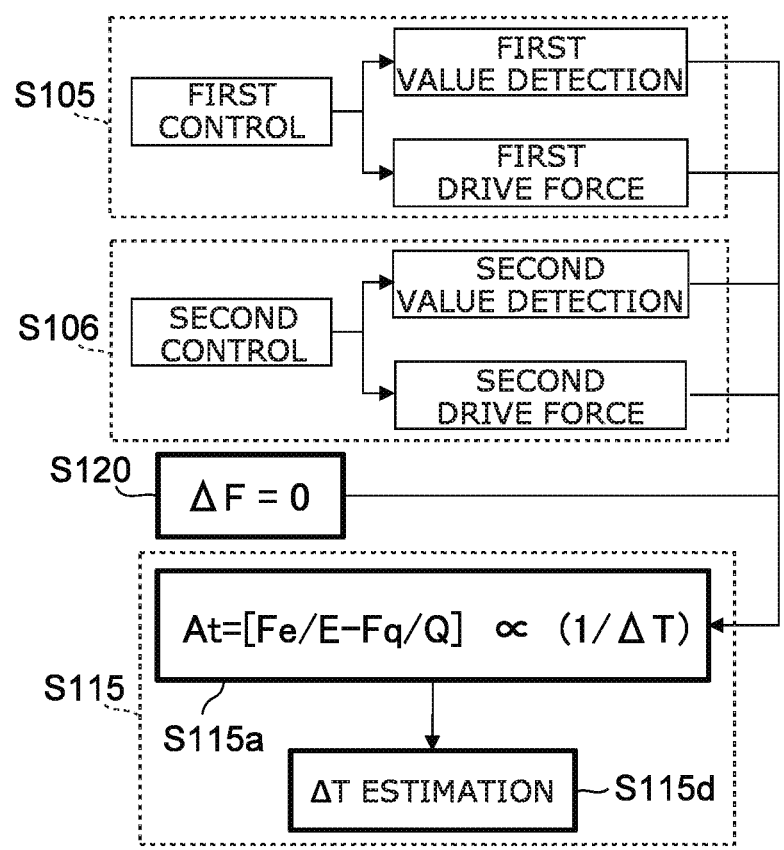
FIG. 14 is a flowchart illustrating an operation of the sensor according to the first embodiment.

FIG. 14 is a flowchart illustrating an operation of the sensor according to the first embodiment.

FIG. 14 shows an example relating to the estimation (step S115) of the difference ΔT. For example, the first value E of the first drive force Fe is obtained by step S105. For example, the second value Q of the second drive force Fq is obtained by step S106. On the other hand, the difference ΔF is substantially 0 due to the second operation (step S120; referring to FIG. 11).

A parameter At is calculated (step S115a). The parameter At is (Fe/E−Fq/Q). The parameter At is proportional to the reciprocal of the difference ΔT (1/ΔT). The difference ΔT can be estimated from the calculation result of the parameter At (step S115d).

For example, the difference ΔT can be reduced by performing the operation recited above by changing the first drive force Fe and the second drive force Fq.

In the first embodiment recited above, for example, there are cases where the absolute value of the difference ΔT between the first time constant T1 and the second time constant T2 changes due to the temperature change. In such a case, based on the change of the absolute value of the difference ΔT due to the temperature change, the controller 74 may modify at least one of the resistance value of the first resistance R1, the resistance value of the second resistance R2, the first voltage Vdc1, or the second voltage Vdc2. For example, a temperature sensor that detects the temperature may be provided; and the controller 74 may modify at least one of the resistance value of the first resistance R1, the resistance value of the second resistance R2, the first voltage Vdc1 of the first end portion ep1, or the second voltage Vdc2 of the second end portion ep2 based on the detection signal output from the temperature sensor.

Second Embodiment

In a second embodiment, the correction operation is performed based on a temperature detection result.

Figure 15:
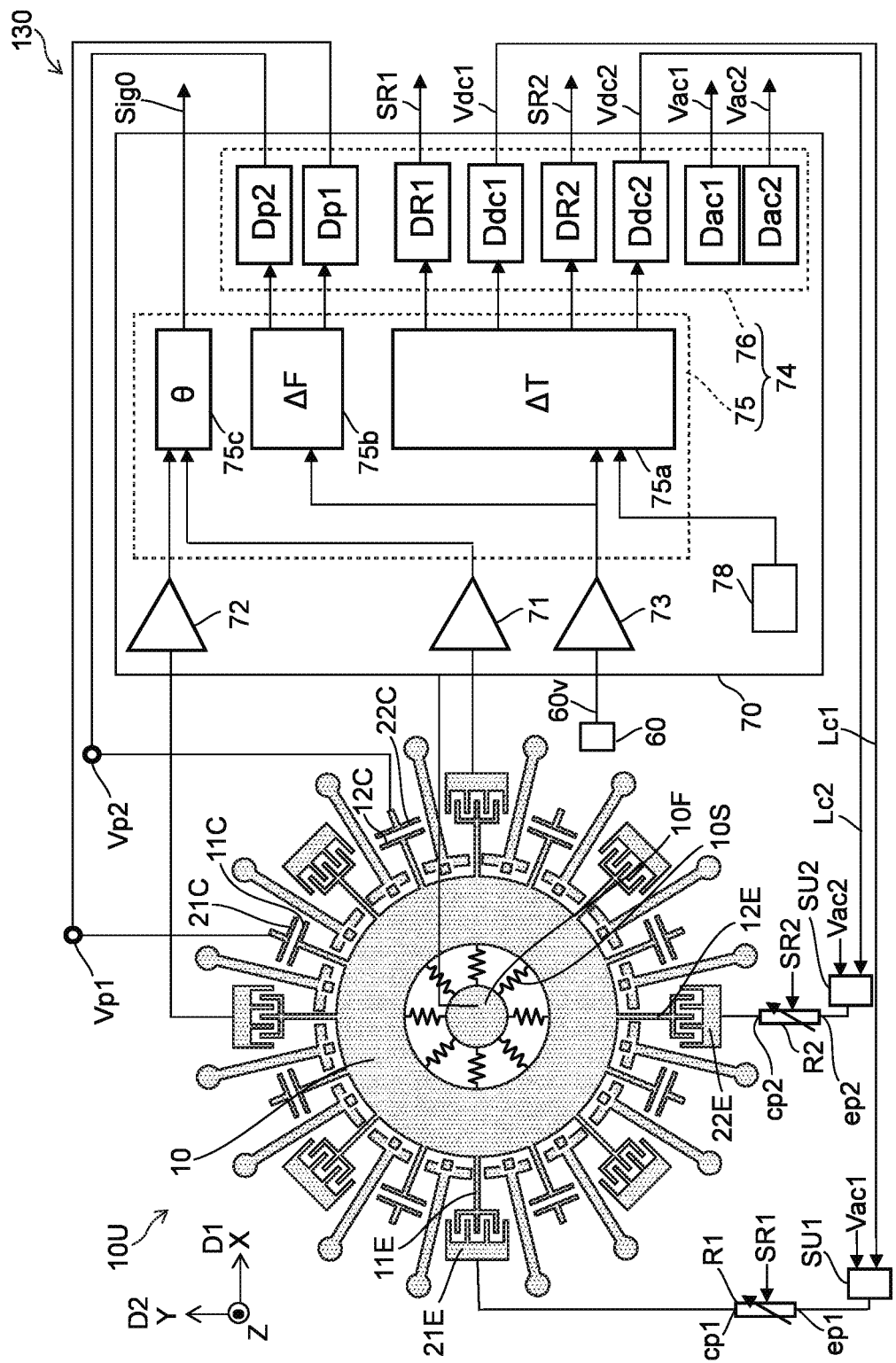
FIG. 15 is a schematic view illustrating a sensor according to the second embodiment.

FIG. 15 is a schematic view illustrating a sensor according to the second embodiment.

As shown in FIG. 15, the sensor 130 according to the embodiment includes the movable member 10, the first counter electrode 21E, the second counter electrode 22E, the first resistance R1, the second resistance R2, a temperature sensor 60, and the control device 70.

The movable member 10 includes the first electrode 11E and the second electrode 12E. The movable member 10 is capable of vibrating. The vibration of the movable member 10 includes the first component along the first direction D1, and the second component along the second direction D2 crossing the first direction D1. The first counter electrode 21E opposes the first electrode 11E. The second counter electrode 22E opposes the second electrode 12E. The first resistance R1 includes the first end portion ep1 and the first other end portion cp1. The second resistance R2 includes the second end portion ep2 and the second other end portion cp2. The first other end portion cp1 is electrically connected to the first counter electrode 21E. The second other end portion cp2 is electrically connected to the second counter electrode 22E. The first adder SU1 and the second adder SU2 are provided in the example. The first end portion ep1 is connected to the control device 70 via the first adder SU1. The second end portion ep2 is connected to the control device 70 via the second adder SU2.

The control device 70 includes the controller 74. The controller 74 can perform the first operation (a control operation based on the temperature). The first operation includes modifying at least one of the resistance value of the first resistance R1, the resistance value of the second resistance R2, the first voltage Vdc1 of the first end portion ep1, or the second voltage Vdc2 of the second end portion ep2 based on a detected value detected by the temperature sensor 60.

For example, in the sensor 130, information (e.g., data) that relates to the change of the characteristics of the vibration due to the change of the temperature can be acquired. The information may be pre-acquired. For example, the information may be stored in memory 78 (referring to FIG. 15) provided in the control device 70, etc. The information that is stored in the memory 78 is supplied to the time constant adjuster 75a of the controller 74.

On the other hand, as shown in FIG. 15, a signal that is obtained from the temperature sensor 60 is supplied to a third detector 73 detecting the temperature. The detected value (the data relating to the temperature) that is detected by the temperature sensor 60 is supplied from the third detector 73 to the time constant adjuster 75a. Based on the detected value detected by the temperature sensor 60 and the information relating to the change of the characteristics of the vibration due to the change of the temperature, the time constant adjuster 75a generates a signal for modifying at least one of the resistance value of the first resistance R1, the resistance value of the second resistance R2, the first voltage Vdc1 of the first end portion ep1, or the second voltage Vdc2 of the second end portion ep2. This signal is supplied to the driver part 76. Based on the signal supplied from the time constant adjuster 75a, the driver part 76 outputs a modified value of at least one of the control signal SR2 of the first resistance R1, the control signal SR1 of the second resistance R2, the first voltage Vdc1, or the second voltage Vdc2. According to the sensor 130, a sensor can be provided in which the accuracy can be increased.

In the sensor 130, for example, the absolute value of the difference ΔT between the first time constant T1 of the first component along the first direction D1 and the second time constant T2 of the second component along the second direction D2 is reduced by modifying at least one of the resistance value of the first resistance R1, the resistance value of the second resistance R2, the first voltage Vdc1 of the first end portion ep1, or the second voltage Vdc2 of the second end portion ep2. For example, the difference ΔT after the modification is smaller than the difference ΔT before the modification.

The embodiments may include the following configurations (e.g., technological proposals).

Configuration 1

A sensor, comprising:
a movable member including a first electrode and a second electrode and being capable of vibrating, the vibration of the movable member including a first component and a second component, the first component being along a first direction, the second component being along a second direction crossing the first direction;
a first counter electrode opposing the first electrode;
a second counter electrode opposing the second electrode;
a first resistance including a first end portion and a first other end portion;
a second resistance including a second end portion and a second other end portion; and
a control device,
the first other end portion being electrically connected to the first counter electrode,
the second other end portion being electrically connected to the second counter electrode,
the control device including a controller configured to perform at least a first operation,
the first operation including
a first acquisition operation of acquiring the first component and the second component, and
a first modification operation of modifying at least one of
a resistance value of the first resistance, a resistance value of the second resistance, a first voltage of the first end portion, or a second voltage of the second end portion to reduce an absolute value of a difference between a first time constant of the acquired first component and a second time constant of the acquired second component.

Configuration 2

The sensor according to Configuration 1, wherein the controller is capable of repeatedly performing the first operation.

Configuration 3

The sensor according to Configuration 1 or 2, wherein a direction of a displacement of the movable member when the first voltage changes crosses a direction of the displacement of the movable member when the second voltage changes.

Configuration 4

The sensor according to any one of Configurations 1 to 3, further comprising:
a first counter conductive portion; and
a second counter conductive portion,
the movable member further including a first conductive portion and a second conductive portion,
the first counter conductive portion opposing the first conductive portion,
the second counter conductive portion opposing the second conductive portion,
the acquired first component having a first resonant frequency,
the acquired second component having a second resonant frequency,
the first operation further including a second modification operation,
in the second modification operation, the controller modifying at least one of a first counter conductive portion voltage of the first counter conductive portion or a second counter conductive portion voltage of the second counter conductive portion to reduce an absolute value of a difference between the first resonant frequency and the second resonant frequency.

Configuration 5

The sensor according to any one of Configurations 1 to 3, further comprising:
a first counter conductive portion; and
a second counter conductive portion,
the movable member further including a first conductive portion and a second conductive portion,
the first counter conductive portion opposing the first conductive portion,
the second counter conductive portion opposing the second conductive portion,
the controller being further configured to perform a second operation,
the second operation including
a second acquisition operation of acquiring the first component and the second component, and
a second modification operation of modifying at least one of a first counter conductive portion voltage of the first counter conductive portion or a second counter conductive portion voltage of the second counter conductive portion to reduce an absolute value of a difference between a first resonant frequency of the acquired first component and a second resonant frequency of the acquired second component.

Configuration 6

The sensor according to Configuration 5, wherein the controller is configured to repeatedly perform the second operation.

Configuration 7

The sensor according to any one of Configurations 4 to 6, wherein a direction of a displacement of the movable member when the first counter conductive portion voltage changes crosses a direction of the displacement of the movable member when the second counter conductive portion voltage changes.

Configuration 8

The sensor according to any one of Configurations 4 to 7, wherein
the movable member vibrates in an elliptical path,
the elliptical path has a first length x1 in a major-axis direction of the elliptical path, and a second length x2 in a minor-axis direction of the elliptical path,
a first value E is $(x1)^2+(x2)^2$,
a second value Q is a product of x1 and x2,
the controller performs at least a first control operation and a second control operation,
in the first control operation, the controller acquires the first value E, supplies a first drive force to the movable member, and maintains the first value E to be constant, and
in the second control operation, the controller acquires the second value Q, supplies a second drive force to the movable member, and maintains the second value Q to be constant.

Configuration 9

The sensor according to any one of Configurations 1 to 8, wherein
the control device includes:
a first detector detecting a first amplitude of the first component; and
a second detector detecting a second amplitude of the second component, and
the controller acquires the first component from the first detector and acquires the second component from the second detector.

Configuration 10

The sensor according to any one of Configurations 1 to 9, wherein the controller causes the movable member to vibrate by applying a first alternating current voltage between the first electrode and the first counter electrode and applying a second alternating current voltage between the second electrode and the second counter electrode.

Configuration 11

The sensor according to any one of Configurations 1 to 9, further comprising a first drive counter electrode,
the movable member includes a first drive electrode,
the first drive counter electrode opposes the first drive electrode,
the controller causes the movable member to vibrate by applying a first alternating current voltage between the first drive electrode and the first drive counter electrode.

Configuration 12

The sensor according to Configuration 11, further comprising a second drive counter electrode,
the movable member includes a second drive electrode,
the second drive counter electrode opposes the second drive electrode,
the controller causes the movable member to vibrate by applying a second alternating current voltage between the second drive electrode and the second drive counter electrode,
a direction of the vibration of the movable member due to the first alternating current voltage crosses a direction of the vibration of the movable member due to the second alternating current voltage.

Configuration 13

The sensor according to any one of Configurations 10 to 12, wherein
the controller causes the movable member to vibrate along an axis direction, and
the controller is configured to rotate the axis direction.

Configuration 14

The sensor according to any one of Configurations 1 to 10, further comprising a first adder,
the first end portion being electrically connected to the control device via the first adder.

Configuration 15

The sensor according to Configuration 14, further comprising a second adder,
the second end portion being electrically connected to the control device via the second adder.

Configuration 16

The sensor according to any one of Configurations 1 to 15, wherein
the first component includes a component of a Coriolis force based on a rotational angular velocity acting on the movable member, and
the second component includes a component of the Coriolis force.

Configuration 17

The sensor according to any one of Configurations 1 to 16, wherein the controller is configured to output, based on the first component and the second component, a signal corresponding to a rotation angle of the movable member.

Configuration 18

The sensor according to any one of Configurations 1 to 17, further comprising a support member, the support member supporting the movable member and being deformable.

Configuration 19

The sensor according to any one of Configurations 1 to 18, wherein
the absolute value of the difference between the first time constant and the second time constant changes due to a temperature change, and
the controller corrects the change of the absolute value due to the temperature change.

Configuration 20

A sensor, comprising:
a movable member including a first electrode and a second electrode and being capable of vibrating, the vibration of the movable member including a first component and a second component, the first component being along a first direction, the second component being along a second direction crossing the first direction;
a first counter electrode opposing the first electrode;
a second counter electrode opposing the second electrode;

a first resistance including a first end portion and a first other end portion;

a second resistance including a second end portion and a second other end portion;

a temperature sensor; and a control device, the first other end portion being electrically connected to the first counter electrode, the first end portion being electrically connected to the control device, the second other end portion being electrically connected to the second counter electrode, the second end portion being electrically connected to the control device, the control device including a controller configured to perform at least a first operation, the first operation including modifying, based on a detected value detected by the temperature sensor, at least one of a resistance value of the first resistance, a resistance value of the second resistance, a first voltage of the first end portion, or a second voltage of the second end portion.

Configuration 21

The sensor according to Configuration 20, wherein an absolute value of a difference between a first time constant of the first component and a second time constant of the second component is reduced by the modifying.

According to the embodiments, a sensor can be provided in which the accuracy can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as movable members, electrodes, conductive portions, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors practicable by an appropriate design modification by one skilled in the art based on the sensors described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
    a movable member including a first electrode and a second electrode and being capable of vibrating, the vibration of the movable member including a first component and a second component, the first component being along a first direction, the second component being along a second direction crossing the first direction;
    a first counter electrode opposing the first electrode;
    a second counter electrode opposing the second electrode;
    a first resistance including a first end portion and a first other end portion;
    a second resistance including a second end portion and a second other end portion;
    a control device;
    a first counter conductive portion; and
    a second counter conductive portion,
    the first other end portion being electrically connected to the first counter electrode,
    the second other end portion being electrically connected to the second counter electrode,
    the control device including a controller configured to perform at least a first operation,
    the first operation including
       a first acquisition operation of acquiring the first component and the second component, and
       a first modification operation of modifying at least one of a resistance value of the first resistance, a resistance value of the second resistance, a first voltage of the first end portion, or a second voltage of the second end portion to reduce an absolute value of a difference between a first time constant of the acquired first component and a second time constant of the acquired second component,
    the movable member further including a first conductive portion and a second conductive portion,
    the first counter conductive portion opposing the first conductive portion,
    the second counter conductive portion opposing the second conductive portion,
    the acquired first component having a first resonant frequency,
    the acquired second component having a second resonant frequency,
    the first operation further including a second modification operation,
    in the second modification operation, the controller modifying at least one of a first counter conductive portion voltage of the first counter conductive portion or a second counter conductive portion voltage of the second counter conductive portion to reduce an absolute value of a difference between the first resonant frequency and the second resonant frequency.

2. The sensor according to claim 1, wherein the controller is configured to repeatedly perform the first operation.

3. The sensor according to claim 1, wherein a direction of a displacement of the movable member when the first voltage changes crosses a direction of the displacement of the movable member when the second voltage changes.

4. A sensor, comprising:
    a movable member including a first electrode and a second electrode and being capable of vibrating, the vibration of the movable member including a first component and a second component, the first component being along a first direction, the second component being along a second direction crossing the first direction;
a first counter electrode opposing the first electrode;
a second counter electrode opposing the second electrode;
a first resistance including a first end portion and a first other end portion;
a second resistance including a second end portion and a second other end portion;
a control device;
a first counter conductive portion; and
a second counter conductive portion,
the first other end portion being electrically connected to the first counter electrode,
the second other end portion being electrically connected to the second counter electrode,
the control device including a controller configured to perform at least a first operation,
the first operation including
  a first acquisition operation of acquiring the first component and the second component, and
  a first modification operation of modifying at least one of a resistance value of the first resistance, a resistance value of the second resistance, a first voltage of the first end portion, or a second voltage of the second end portion to reduce an absolute value of a difference between a first time constant of the acquired first component and a second time constant of the acquired second component,
the movable member further including a first conductive portion and a second conductive portion,
the first counter conductive portion opposing the first conductive portion,
the second counter conductive portion opposing the second conductive portion,
the controller being further configured to perform a second operation,
the second operation including
  a second acquisition operation of acquiring the first component and the second component, and
  a second modification operation of modifying at least one of a first counter conductive portion voltage of the first counter conductive portion or a second counter conductive portion voltage of the second counter conductive portion to reduce an absolute value of a difference between a first resonant frequency of the acquired first component and a second resonant frequency of the acquired second component.

5. The sensor according to claim 4, wherein the controller is configured to repeatedly perform the second operation.

6. The sensor according to claim 1, wherein a direction of a displacement of the movable member when the first counter conductive portion voltage changes crosses a direction of the displacement of the movable member when the second counter conductive portion voltage changes.

7. The sensor according to claim 1, wherein
the movable member vibrates in an elliptical path,
the elliptical path has a first length x1 in a major-axis direction of the elliptical path, and a second length x2 in a minor-axis direction of the elliptical path,
a first value E is $(x1)^2+(x2)^2$,
a second value Q is a product of x1 and x2,
the controller performs at least a first control operation and a second control operation,
in the first control operation, the controller acquires the first value E, supplies a first drive force to the movable member, and maintains the first value E to be constant, and
in the second control operation, the controller acquires the second value Q, supplies a second drive force to the movable member, and maintains the second value Q to be constant.

8. The sensor according to claim 1, wherein
the control device includes:
  a first detector configured to detect a first amplitude of the first component; and
  a second detector configured to detect a second amplitude of the second component, and
the controller acquires the first component from the first detector and acquires the second component from the second detector.

9. The sensor according to claim 1, wherein the controller causes the movable member to vibrate by applying a first alternating current voltage between the first electrode and the first counter electrode and applying a second alternating current voltage between the second electrode and the second counter electrode.

10. A sensor, comprising:
a movable member including a first electrode and a second electrode and being capable of vibrating, the vibration of the movable member including a first component and a second component, the first component being along a first direction, the second component being along a second direction crossing the first direction;
a first counter electrode opposing the first electrode;
a second counter electrode opposing the second electrode;
a first resistance including a first end portion and a first other end portion;
a second resistance including a second end portion and a second other end portion;
a control device;
a first drive counter electrode; and
a second drive counter electrode,
the first other end portion being electrically connected to the first counter electrode,
the second other end portion being electrically connected to the second counter electrode,
the control device including a controller configured to perform at least a first operation,
the first operation including
  a first acquisition operation of acquiring the first component and the second component, and
  a first modification operation of modifying at least one of a resistance value of the first resistance, a resistance value of the second resistance, a first voltage of the first end portion, or a second voltage of the second end portion to reduce an absolute value of a difference between a first time constant of the acquired first component and a second time constant of the acquired second component,
the movable member includes a first drive electrode,
the first drive counter electrode opposing the first drive electrode,
the controller being configured to cause the movable member to vibrate by applying a first alternating current voltage between the first drive electrode and the first drive counter electrode,
the movable member including a second drive electrode,
the second drive counter electrode opposing the second drive electrode, the controller being configured to cause the movable member to vibrate by applying a second alternating current voltage between the second drive electrode and the second drive counter electrode, a direction of the vibration of the movable member due to the first alternating current voltage crossing a direction of the vibration of the movable member due to the second alternating current voltage.

11. The sensor according to claim 9, wherein
the controller causes the movable member to vibrate along an axis direction, and
the controller is configured to rotate the axis direction.

12. The sensor according to claim 1, further comprising a first adder,
the first end portion being electrically connected to the control device via the first adder.

13. The sensor according to claim 12, further comprising a second adder,
the second end portion being electrically connected to the control device via the second adder.

14. The sensor according to claim 1, wherein
the first component includes a component of a Coriolis force based on a rotational angular velocity acting on the movable member, and
the second component includes a component of the Coriolis force.

15. The sensor according to claim 1, wherein the controller is configured to output, based on the first component and the second component, a signal corresponding to a rotation angle of the movable member.

16. The sensor according to claim 1, further comprising a support member, the support member supporting the movable member and being deformable.

17. The sensor according to claim 1, wherein
the absolute value of the difference between the first time constant and the second time constant changes due to a temperature change, and
the controller corrects the change of the absolute value due to the temperature change.

* * * * *